Patented Aug. 31, 1948

2,448,358

UNITED STATES PATENT OFFICE 2,448,358

PLASTICIZED POLYVINYL ALCOHOL COMPOSITIONS

Charles Dangelmajer, Nutley, N. J., assignor to Resistoflex Corporation, Belleville, N. J., a corporation of New York No Drawing. Application November 27, 1944, Serial No. 565,397

5 Claims. (Cl. 260—31.8)

This invention relates to polyvinyl alcohol compositions, more particularly to plasticized polyvinyl alcohol compositions.

Polyvinyl alcohol is available in various grades which differ with respect to the degree of polymerization, the degree of hydrolysis as indicated by a saponification number, and their viscosity in solution.

In making solid shaped articles from polyvinyl alcohol, plasticizers are customarily added to obtain the flexibility and elasticity which are generally desired in such articles as sheets or films, tubing, gaskets, diaphragms, filaments and the like. Other modifying agents may often be used to obtain special characteristics such as, for example, as flexibility at low temperature and retention of flexibility at elevated temperature.

As between the ingredients of such compositions there is frequently a lack of compatibility as manifested by opacity, granulation, lump formation and lack of uniformity. Such lack of compatibility may also be indicated by opacity occurring at the point of bending of a normally transparent article. Another defect encountered in many compositions is that they are difficult or impossible to extrude due to inadequate flowing properties at elevated temperatures.

The general object of the invention is to produce improved plasticized polyvinyl alcohol compositions. More specific objects are to produce better compatibility of the ingredients whereby the products are more uniform, smoother and more transparent; to improve the flowing properties of the products to make them more amenable to forming processes; and to produce products which will retain their flexibility at lower temperatures.

I have found that the incompatibility is eliminated, the flowing properties are greatly improved and in many cases products having flexibility at lower temperatures are produced by the incorporation in plasticized polyvinyl alcohol compositions of relatively small amounts of phthalic anhydride. In general the quantity required may vary from 2% to 20% (based on the quantity of polyvinyl alcohol in the composition) the optimum quantity depending upon the ingredients and proportions of the particular composition. Usually the quantity used will not need to be more than about 5%.

The advantages of the discovery will more particularly appear from the following examples which show various embodiments of the invention for purposes of illustration. The invention may, of course, be practiced otherwise than as specifically set forth in the examples.

Example I

Compositions were prepared containing the following ingredients in the amounts given, in parts by weight, "PVA" indicating polyvinyl alcohol and "Sap. No." meaning its saponification number which indicates the degree of hydrolysis.

|  | A | B |
|---|---|---|
| PVA, Sap. No. range 0–18 | 100 | 100 |
| Glycerol | 40 | 40 |
| Water | 27 | 27 |
| Formamide | 10 | 10 |
| Phthalic Anhydride |  | 3 |

In this example and in the others hereinafter given the phthalic anhydride (and other soluble solids where used) was first dissolved in the liquid ingredients which are mixed together and then uniformly mixed with the dry PVA. A preferred way of doing this is to spray the solution on the PVA as it is being constantly stirred in any suitable mixer. The resulting admixture was then formed into a web, as taught in Patent No. 2,177,612, by passing the moistened particulate material through rolls. Layers of the web were then placed in a heated mold under pressure and formed into sheets, compositions A and B being thus processed under identical conditions. Composition B, containing the phthalic anhydride, showed a marked improvement over composition A with respect to uniformity, transparency and flowing properties during molding.

Example II

In this example a different grade of polyvinyl alcohol was used which produces a composition which normally has adequate flowing properties. The compositions were as follows:

|  | A | B |
|---|---|---|
| PVA, Sap. No. range 72–105 | 100 | 100 |
| Glycerol | 35 | 35 |
| Water | 36 | 36 |
| Formamide | 7 | 7 |
| Phthalic anhydride |  | 3 |

The addition of the phthalic anhydride improved the compatibility and also had the surprising effect of lowering the temperature at which the shaped articles remained flexible. Strips cut from molded sheets and tested for flexibility showed that composition A became brittle at −30° C. whereas composition B remained flexible at −40° C.

Example III

Compositions of the following ingredients were prepared containing ferrous sulfate as taught in my co-pending application Serial No. 440,969, now Patent No. 2,395,616, issued February 26, 1946.

| | A | B |
|---|---|---|
| PVA, Sap. No. range 72–105 | 100 | 100 |
| Glycerol | 35 | 35 |
| Water | 37 | 37 |
| Formamide | 8 | 8 |
| Ferrous Sulfate | 8 | 8 |
| Phthalic anhydride | | 5 |

In composition B the phthalic anhydride was dissolved in a mixed solution of the glycerol, water, formamide and ferrous sulfate and sprayed on the PVA. Composition A, used in an attempt to extrude tubing, gave a product which was very rough and lumpy so as to be entirely unsatisfactory as an extruded product. The product was also opaque. Composition B, differing only by the addition of 5% of phthalic anhydride, extruded perfectly as a smooth product, uniform in texture and transparent.

Example IV

Compositions of the following ingredients were prepared containing paraform as a plasticizer as disclosed in my copending application Ser. No. 511,554.

| | A | B |
|---|---|---|
| PVA, Sap. No. range 72–105 | 100 | 100 |
| Glycerol | 35 | 35 |
| Water | 36 | 36 |
| Formamide | 7 | 7 |
| Paraform | 15 | 15 |
| Phthalic anhydride | | 2 |

As stated in said copending application, the addition of formamide to a composition plasticized with glycerol, water and paraform improves the flowing properties of the composition to the point where it becomes extrudable. The best results, using formamide for this purpose, require its use in the proportion of about 3 parts of formamide to 2 parts of paraform. It will be noted that in the above compositions of this example the proportion of formamide is much lower. By adding only 2 parts of phthalic anhydride, however, the flowing properties are very greatly improved and a readily extrudable composition obtained. The addition of phthalic anhydride furthermore improved the compatibility, as indicated by the transparency of the resulting product, and improved the low temperature flexibilty to the same degree as in Example II.

It has been observed that the use of phthalic anhydride as a modifying or addition agent for plasticized polyvinyl alcohol compositions is of particular value where polyvinyl alcohols of low saponification number (i. e. below about 20) having viscosities above about 15 centipoises (measured on a 4% aqueous solution at 20° C.) are used. This type of polyvinyl alcohol tends to exhibit incompatibility and inadequate flowing properties to a greater degree than polyvinyl alcohols having the same degree of saponification but lower viscosities or having higher saponification numbers. For example, one grade which has a Sap. No. range of 0–18 and an average viscosity of about 50 produces products which are very hard to extrude, yet the addition of 3% (based on the PVA) of phthalic anhydride entirely eliminates this difficulty and at the same time improves the clarity and low temperature flexibility of the composition.

It is to be understood that the specific examples herein are for purposes of illustration and that the invention is not limited thereto but should be construed broadly within the purview of the claims.

What is claimed is:

1. A solid extrudable composition of matter comprising polyvinyl alcohol, polyhydric alcohol plasticizer for the polyvinyl alcohol, and phthalic anhydride in an amount from 2% to 20% of the polyvinyl alcohol.

2. A solid extrudable composition of matter comprising polyvinyl alcohol having a saponification number of about 20 or lower and a viscosity above about 15 centipoises in 4% aqueous solution, polyhydric alcohol plasticizer for the polyvinyl alcohol, and phthalic anhydride as a modifying agent in an amount from 2% to 20% of the polyvinyl alcohol.

3. A solid composition capable of being extruded as a smooth, uniform, transparent body comprising polyvinyl alcohol, glycerol, water, formamide, and phthalic anhydride in an amount from 2% to 20% of the polyvinyl alcohol.

4. A solid extrudable composition of matter containing polyvinyl alcohol, polyhydric alcohol plasticizer for the polyvinyl alcohol, ferrous sulfate, and phthalic anhydride in an amount from 2% to 20% of the polyvinyl alcohol.

5. A solid extrudable composition of matter containing polyvinyl alcohol, plasticizers for the polyvinyl alcohol including a solid formaldehyde polymer and a polyhydric alcohol, and phthalic anhydride in an amount from 2% to 20% of the polyvinyl alcohol.

CHARLES DANGELMAJER.

REFERENCES CITED

The following references are of record in the file of this patent:

UNITED STATES PATENTS

| Number | Name | Date |
|---|---|---|
| 2,035,939 | Belloc | Mar. 31, 1936 |
| 2,083,628 | Zelger | Jan. 15, 1937 |
| 2,169,250 | Izard | Aug. 15, 1939 |
| 2,246,915 | Dangelmajer | June 24, 1941 |
| 2,271,468 | Watkins | Jan. 27, 1942 |
| 2,399,401 | Sonnichsen et al. | Apr. 30, 1946 |
| 2,399,456 | Yates | Apr. 30, 1946 |